United States Patent [19]

Werle et al.

[11] 3,899,144

[45] Aug. 12, 1975

[54] POWDER CONTRAIL GENERATION

[75] Inventors: Donald K. Werle, Hillside; Romas Kasparas, Riverside; Sidney Katz, Chicago, all of Ill.

[73] Assignee: The United States of America as represented by the Secretary of the Navy, Washington, D.C.

[22] Filed: July 22, 1974

[21] Appl. No.: 490,610

[52] U.S. Cl. ............... 244/136; 40/213; 116/114 F; 241/5

[51] Int. Cl.² ............................................ B64D 1/16

[58] Field of Search ........... 244/136; 40/213; 241/5, 241/29; 222/3, 4; 239/171; 116/28 R, 114 R, 114 F, 114 N, 124 R, 124 B, 124 C

[56] References Cited

UNITED STATES PATENTS

| | | | |
|---|---|---|---|
| 1,619,183 | 3/1927 | Bradner et al. | 244/136 |
| 2,045,865 | 6/1936 | Morey | 40/213 |
| 2,591,988 | 4/1952 | Willcox | 241/5 X |
| 3,531,310 | 9/1970 | Goodspeed et al. | 241/5 X |
| R15,771 | 2/1924 | Savage | 40/213 |

FOREIGN PATENTS OR APPLICATIONS

| | | | |
|---|---|---|---|
| 1,022,621 | 3/1966 | United Kingdom | 241/5 |

*Primary Examiner*—Trygve M. Blix
*Assistant Examiner*—Barry L. Kelmachter
*Attorney, Agent, or Firm*—Richard S. Sciascia; Joseph M. St. Amand

[57] ABSTRACT

Light scattering pigment powder particles, surface treated to minimize interparticle cohesive forces, are dispensed from a jet mill deagglomerator as separate single particles to produce a powder contrail having maximum visibility or radiation scattering ability for a given weight material.

12 Claims, 1 Drawing Figure

POWDER CONTRAIL GENERATION

BACKGROUND

The present invention relates to method and apparatus for contrail generation and the like.

An earlier known method in use for contrail generation involves oil smoke trails produced by injecting liquid oil directly into the hot jet exhaust of an aircraft target vehicle. The oil vaporizes and recondenses being the aircraft producing a brilliant white trail. Oil smoke trail production requires a minimum of equipment; and, the material is low in cost and readily available. However, oil smoke requires a heat source to vaporize the liquid oil and not all aircraft target vehicles, notably towed targets, have such a heat source. Also, at altitudes above about 25,000 feet oil smoke visibility degrades rapidly.

SUMMARY

The present invention is for a powder generator requiring no heat source to emit a "contrail" with sufficient visibility to aid in visual acquisition of an aircraft target vehicle and the like. The term "contrail" was adopted for convenience in identifying the visible powder trail of this invention. Aircraft target vehicles are used to simulate aerial threats for missile tests and often fly at altitudes between 5,000 and 20,000 feet at speeds of 300 and 400 knots or more. The present invention is also suitable for use in other aircraft vehicles to generate contrails or reflective screens for any desired purpose.

The powder contail generator is normally carried on an aircraft in a pod containing a ram air tube and powder feed hopper. Powder particles, surface treated to minimize interparticle cohesive forces are fed from the hopper to a deagglomerator and then to the ram air tube for dispensing as separate single particles to produce a contrail having maximum visibility for a given weight material.

Other object, advantages and novel features of the invention will become apparent from the following detailed description of the invention when considered in conjunction with the accompanying drawing.

DESCRIPTION OF PREFERRED EMBODIMENT

Figure 1:
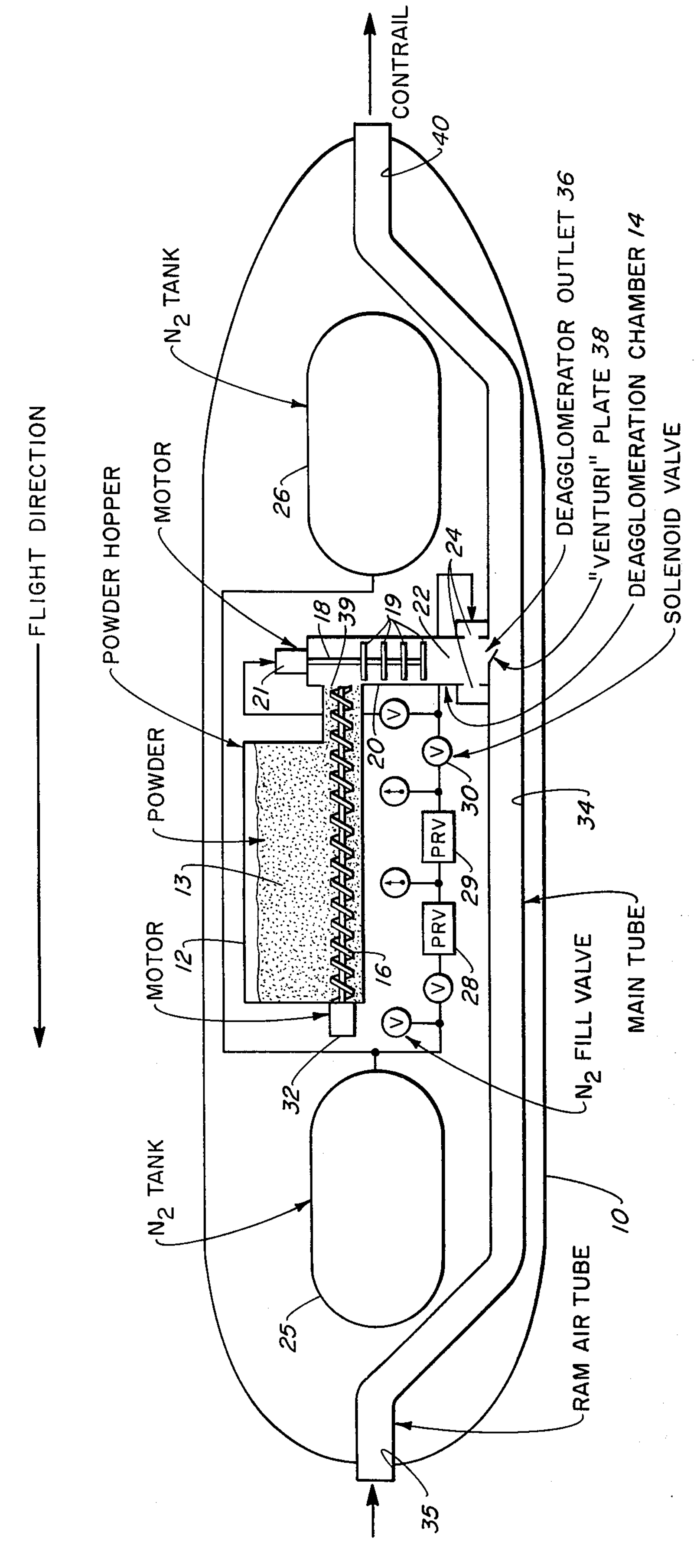
FIG. 1 is a schematic sectional side-view of a powder contrail generator of the present invention.

The powder contail generator in pod 10, shown in FIG. 1, is provided with a powder feed hopper 12 positioned in the center section of the pod and which feeds a powder 13 to a deagglomerator 14 by means of screw conveyors 16 across the bottom of the hopper. The deagglomerator 14 produces two stages of action. In the first stage of deagglomeration, a shaft 18 having projecting radial rods 19 in compartment 20 is rotated by an air motor 21, or other suitable drive means. The shaft 18 is rotated at about 10,000 rpm, for example. As powder 13 descends through the first stage compartment 20 of the deagglomeration chamber, the hammering action of rotating rods 19 serves to aerate and precondition the powder before the second stage of deagglomeration takes place in the jet mill section 22. In the jet mill 22, a plurality of radial jets 24 (e.g., six 0.050 inch diamter radial jets) direct nitrogen gas (at e.g., 120 psig) inward to provide energy for further deagglomeration of the powder. The $N_2$, or other suitable gas, is provided from storage tanks 25 and 26, for example, in the pod.

The jet mill 22 operates in a similar manner to commercial fluid energy mills except that there is no provision for recirculation of oversize particles. Tests with the deagglomerator show that at a feed rate of approximately 1½ lb/min, treated titanium dioxide powder pigment is effectively dispersed as single particles with very few agglomerates evident.

The nitrogen gas stored in cylinder tanks 25 and 26 is charged to 1800 psig, for example. Two stages of pressure reduction, for example, by pressure reduction valves 28 and 29, bring the final delivery pressure at the radial jets 24 and to the air motor 21 to approximately 120 psig. A solenoid valve 30 on the 120 psig line is connected in parallel with the electric motor 32 which operates the powder feeder screws 16 for simultaneous starting and running of the powder feed, the air motor and the jet mill deagglomerator.

Air enters ram air tube 34 at its entrance 35 and the exhaust from the jet mill deagglomerator passes directly into the ram air tube. At the deagglomerator exhaust 36 into ram air tube 34, an upstream deflector baffle 38 produces a venturi effect which minimizes back pressure on the powder feed system. The powder is then jetted from the exhaust end 40 of the ram air tube to produce a contrail. A pressure equalization tube, not shown, can be used to connect the top of the closed hopper 12 to the deagglomeration chamber 14. A butterfly valve could be provided at the powder hopper outlet 39 to completely isolate and seal off the powder supply when not in use. Powder 13 could then be stored in hopper 12 for several weeks, without danger of picking up excessive moisture, and still be adequately dispensed.

Preparation of the light scatter powder 13 is of a critical importance to production of a powder "contrail" having maximum visibility for a given weight of material. It is essential that the pigment powder particles be dispensed as separate single particles rather than as agglomerates of two or more particles. The powder treatment produces the most easily dispersed powder through the use of surface treatments which minimize interparticle cohesive forces.

Titanium dioxide pigment was selected as the primary light scattering material because of its highly efficient light scattering ability and commercially available pigment grades. Titanium dioxide pigment (e.g., DuPont R—931) with a median particle size of about 0.3$\mu$ has a high bulk density and is not readily aerosolizable as a submicron cloud without the consumption of a large amount of deagglomeration energy. In order to reduce the energy requirement for deagglomeration, the $TiO_2$ powder is specially treated with a hydrophobic colloidal silica which coats and separates the individual $TiO_2$ pigment particles. The extremely fine particulate nature (0.007$\mu$ primary particle size) of Cobot S—101 Silanox grade, for example, of colloidal silica minimizes the amount needed to coat and separate the $TiO_2$ particles, and the hydrophobic surface minimizes the affinity of the powder for absorbtion of moisture from the atmosphere. Adsorbed moisture in powders causes liquid bridges at interparticle contacts and it then becomes necessary to overcome the adsorbed-liquid surface tension forces as well as the weaker Van der Waals' forces before the particles can be separated.

The Silanox treated titanium dioxide pigment is further protected from the deleterious effects of adsorbed moisture by incorporation of silica gel. The silica gel preferentially adsorbs water vapor that the powder may be exposed to after drying and before use. The silica gel used is a powder product, such as Syloid 65 from the W. R Grace and Co., Davison Chemical Division, and has an average particle size about 4.5$\mu$ and a large capacity for moisture at low humidities.

A typical powder composition used is shown in Table 1. This formulation was blended intimately with a Patterson-Kelley Co. twin shell dry LB–model LB—2161 with intensifier. Batches of 1500 g were blended for 15 min. each and packaged in 5-lb cans. The bulk density of the blended powder is 0.22 g/cc. Since deagglomeration is facilitated by having the powder bone dry, the powder should be predried before sealing the cans. In view of long periods (e.g., about 4 months) between powder preparation and use it is found preferable to spread the powder in a thin layer in an open container and place in a 400°F over two days before planned usage. The powder is removed and placed in the hopper about 2 hours before use.

Table 1

CONTRAIL POWDER FORMULATION

| Ingredient | % by Weight |
|---|---|
| $TiO_2$ (e.g., DuPont R-931) median particle size 0.3$\mu$ | 85 |
| Colloidal Silica (e.g., Cabot S-101 Silanox) primary particle size 0.007$\mu$ | 10 |
| Silica gel (e.g., Syloid 65) average particle size 4.5$\mu$ | 5 |

Other type powder compositions can also be used with the apparatus described herein. For example, various powder particles which reflect electromagnetic radiation can be dispensed as a chaff or the like from the contrail generator.

Obviously many modifications and variations of the present invention are possible in the light of the above teachings. It is therefore to be understood that within the scope of the appended claims the invention may be practiced otherwise than as specifically described.

What is claim is:

1. Contrail generation apparatus for producing a powder contrail having maximum radiation scattering ability for a given weight material, comprising:

a. an aerodynamic housing;

b. a jet tube means passing through said housing, said tube means having an inlet at a forward end of said housing and an exhaust at a rearward end thereof;

c. a powder storage means in said housing;

d. a deagglomeration means also in said housing;

e. means connecting said powder storage means with said deagglomeration means for feeding radiation scattering powder from said powder storage means to said deagglomeration means;

f. the output of said deagglomeration means dispensing directly into said jet tube means for exhausting deagglomerated powder particles into the atmosphere to form a contrail; and h. means for controlling the flow of said powder from said storage means to said deagglomeration means.

2. Apparatus as in claim 1 wherein said jet tube means is a ram air jet tube.

3. Apparatus as in claim 1 wherein an upstream deflector baffle is provided at the output of said deagglomeration means into said jet tube means to produce a venturi effect for minimizing back pressure on said powder feeding means.

4. Apparatus as in claim 1 wherein said deagglomerator means comprises:

a. means for subjecting powder particles from said powder storage means to a hammering action to aerate and precondition the powder; and b. a jet mill means to further deagglomerate the powder into separate particles.

5. Apparatus as in claim 4 wherein pressurized gas means is provided for operating said deagglomeration means.

6. Apparatus as in claim 1 wherein said radiation scattering powder particles are titanium dioxide pigment having a median particle size of about 0.3 microns.

7. Apparatus as in claim 1 wherein said radiation scattering powder particles have a coating of extremely fine hydrophobic colloidal silica thereon to minimize interparticle cohesive forces.

8. Apparatus as in claim 1 wherein the formulation of said powder consists of 85% by weight of $TiO_2$ pigment of approximately 0.3 micron media particle size, 10% by weight of colloidal silica of 0.007 micron primary particle size, and 5% by weight of silica gel having an average particle size of 4.5 microns.

9. The method of producing a light radiation scattering contrail, comprising:

a. surface treating light scattering powder particles to minimize interparticle cohesive forces;

b. deagglomerating said powder particles in two stages prior to dispensing into a jet tube by subjecting said powder particles to a hammering action in the first stage to aerate and precondition the powder, and by passing said powder through a jet mill in the second stage to further deagglomerate the powder;

c. dispensing the deagglomerated powder from the jet mill directly into a jet tube for exhausting said powder into the atmosphere, thus forming a contrail.

10. A method as in claim 9 wherein said light scattering powder particles is titanium dioxide pigment.

11. A method as in claim 9 wherein said powder particles are treated with a coating of extremely fine hydrophobic colloidal silica to minimize interparticle cohesive forces.

12. A method as in claim 11 wherein said treated powder particles are further protected with a silica gel powder.

* * * * *